US006985803B2

(12) United States Patent
Abdel-Malek et al.

(10) Patent No.: US 6,985,803 B2
(45) Date of Patent: Jan. 10, 2006

(54) SYSTEM AND METHOD FOR MONITORING THE CONDITION OF A VEHICLE

(75) Inventors: Aiman Albert Abdel-Malek, Erie, PA (US); Steven Hector Azzaro, Schenectady, NY (US); Robert A. Hedeen, Clifton Park, NY (US); Larry R. Handler, Erie, PA (US); Robert D. Cryer, Erie, PA (US); Cecil M. Daniel, Erie, PA (US)

(73) Assignee: General Electric Company

( * ) Notice: Subject to any disclaimer, the term of this patent is extended or adjusted under 35 U.S.C. 154(b) by 212 days.

(21) Appl. No.: 10/159,512

(22) Filed: May 30, 2002

(65) Prior Publication Data

US 2004/0019577 A1 Jan. 29, 2004

Related U.S. Application Data

(60) Provisional application No. 60/294,330, filed on May 30, 2001.

(51) Int. Cl.
*G05D 1/00* (2006.01)
*G06F 7/00* (2006.01)

(52) U.S. Cl. ............................ 701/33; 701/19; 701/29; 701/31; 246/122 R; 246/167 R; 246/169 R

(58) Field of Classification Search ............ 701/19–20, 701/29–36; 246/1 R, 167 R, 122 R, 169 R, 246/174, 182 R, 182 A, 182 B, 183; 340/438–439, 340/425.5, 426.13, 3.3–3.32, 343–344, 540
See application file for complete search history.

(56) References Cited

U.S. PATENT DOCUMENTS

| | | | | | |
|---|---|---|---|---|---|
| 4,087,067 | A | * | 5/1978 | Bahker et al. | 246/167 R |
| 4,188,618 | A | * | 2/1980 | Weisbart | 340/870.16 |
| 4,207,569 | A | * | 6/1980 | Meyer | 342/44 |
| 4,977,577 | A | * | 12/1990 | Arthur et al. | 375/146 |
| 5,703,929 | A | * | 12/1997 | Schillaci et al. | 379/21 |
| 5,786,998 | A | * | 7/1998 | Neeson et al. | 701/35 |
| 5,806,011 | A | | 9/1998 | Azzaro et al. | 701/99 |
| 5,845,272 | A | | 12/1998 | Morjaria et al. | 706/50 |

(Continued)

FOREIGN PATENT DOCUMENTS

WO WO 9009645 A1 * 8/1990

*Primary Examiner*—Jacques H. Louis-Jacques
(74) *Attorney, Agent, or Firm*—Scott Andes, Esquire; Robert L. Wolter, Esquire; Beusse Brownlee Wolter Mora & Maire, P.A.

(57) ABSTRACT

A system for monitoring the condition of a vehicle has at least one wireless transmitter in on the vehicle, and in communication with the vehicle computer system. Data representative of operating parameters generated during the operation of the vehicle is downloaded to the transmitter, which transmits the data to a wireless receiver positioned proximal to a path of travel of the vehicle. The receiver is linked to a processor for transmission of the data to the processor for storage and processing if necessary. The system may also include at least one sensor, positioned proximal the path of travel, for detecting a physical phenomenon emanating from at least one vehicle component. The sensor generates a signal, which is transmitted to the processor. The processor is capable of analyzing the signal generating data indicative of operating condition of the vehicle component. The sensor, and/or receiver, mounted to a structure positioned proximal the path of travel of the vehicle.

4 Claims, 6 Drawing Sheets

U.S. PATENT DOCUMENTS

| | | | | | |
|---|---|---|---|---|---|
| 5,867,801 | A | | 2/1999 | Denny | 701/35 |
| 5,880,710 | A | | 3/1999 | Jaberi et al. | 345/618 |
| 5,961,567 | A | * | 10/1999 | Azzaro et al. | 701/99 |
| 6,025,920 | A | * | 2/2000 | Dec | 356/438 |
| 6,067,044 | A | * | 5/2000 | Whelan et al. | 342/357.07 |
| 6,167,333 | A | * | 12/2000 | Gehlot | 701/35 |
| 6,263,322 | B1 | | 7/2001 | Kirkevold et al. | 705/400 |
| 6,278,921 | B1 | * | 8/2001 | Harrison et al. | 701/35 |
| 6,301,531 | B1 | * | 10/2001 | Pierro et al. | 701/29 |
| 6,377,876 | B1 | * | 4/2002 | Hedeen et al. | 701/19 |
| 6,404,506 | B1 | * | 6/2002 | Cheng et al. | 356/634 |
| 6,487,478 | B1 | * | 11/2002 | Azzaro et al. | 701/24 |
| 6,580,983 | B2 | * | 6/2003 | Laguer-Diaz et al. | 701/35 |
| 6,681,160 | B2 | * | 1/2004 | Bidaud | 701/19 |

* cited by examiner

SYSTEM AND METHOD FOR MONITORING THE CONDITION OF A VEHICLE

This application claims priority of Provisional Patent Application Ser. No. 60/294,330, filed on May 30, 2001.

BACKGROUND OF THE INVENTION

The present invention relates, in general, to methods and systems for monitoring the condition of vehicles. More specifically, the present invention pertains systems for the wireless transmission of data during the operation of the vehicle, and the non-contact or non-intrusive detection of phenomena emanating from a vehicle, that is relative to the operation of the vehicle.

The management of remote operating assets, such as vehicles, including but not limited to, trucks, ships, and railway locomotives, is a challenging logistical effort. The owners and/or leasors of such assets continually attempt to improve the efficiency of operations of these assets. For example, railroads must manage their fleets of locomotives to maximize the on-rail time in order to remain competitive with alternative modes of transportation. Such management systems typically incorporate maintenance services, in which vehicle condition-related data is continuously monitored and updated.

Operations of mobile assets may be burdened by overspending on maintenance, both in direct costs and in loss of productivity of the assets due to down time for maintenance of the vehicles. Unplanned down time of the mobile assets may not correspond to scheduled maintenance of vehicles; thereby, increasing operating costs. Timely delivery of information concerning the condition of component parts, and condition of vehicles, presents a substantial opportunity for productivity enhancement of these mobile assets. Accordingly, an inline system for monitoring vehicles is needed to determine the condition of certain components and an overall condition of the vehicle. With this information, maintenance schedules may be updated, reducing the downtime of a mobile asset and enhancing the productivity of the mobile assets in general.

Some systems are adapted for on-board analysis to provide real-time condition of the vehicle condition or health. Systems exist which include on-board sensors for detecting certain phenomena relative operating parameters of the vehicle. Data obtained from these sensors is stored on the vehicle computer systems. Typical monitoring systems require that data, relative to the operating parameters of the vehicle, and other information concerning the vehicle, is periodically downloaded from the vehicle computer systems when the vehicle is stopped for servicing. In addition, some systems are adapted for wireless transmission via satellite transmission and data links. However, such systems permit transmissions only at limited locations. In addition, systems do not presently exist that provide detection capabilities that are "off-board", and transmit data during the online operation of a vehicle, in a non-intrusive manner.

BRIEF SUMMARY OF THE INVENTION

Accordingly, a system and method are described herein for monitoring the condition of a vehicle, and/or its component parts, during operation of the vehicle, comprising the wireless transmission of data from the vehicle to at least one off-board wireless receiver positioned proximal to a path of travel followed by the vehicle. Similarly, the invention may comprise the non-contact and non-intrusive detecting of phenomena associated with at least one operating parameter of the vehicle.

In an exemplary embodiment, the system comprises at least one wireless transmitter, disposed on the vehicle for transmitting data stored on the vehicle and the data is relative to the operation of the vehicle. In addition, at least one wireless receiver is positioned proximal to a path of travel of the vehicle for receiving the data transmitted from the vehicle as the vehicle passes the receiver. A processor is preferably provided in communication with the receiver for receiving and storing the data from the receiver.

The system may comprise a structure for supporting at least a portion of the monitoring system, and the receiver may be mounted to the structure. The structure may be positioned at various locations where the vehicle may travel at a reduced speed. For example the structure may positioned adjacent a vehicle servicing station.

The system may also comprise at least one sensor secured to the structure, enabling the sensor to detect at least one phenomena emanating from the vehicle and/or its component parts. As the vehicle approaches a service station, the vehicle travels at a slow rate of speed, and the sensor is capable of detecting phenomena, e.g. heat, vibration and/or sounds generated by components that are associated with one or more operating parameters of the components.

As the vehicle passes the structure, the sensor detects the phenomena and generates a signal responsive thereto, which signal is transmitted to a processor. The processor receives the data and is capable of generating a signal indicative of the physical phenomena. In an exemplary embodiment, the processor is capable of identifying a component on the vehicle from which the phenomena emanates and analyzes the data to provide a condition of the component, and/or a recommendation for maintenance of the component on the vehicle. For example, a database may provide at least one geometric configuration of a vehicle that identifies all components and their location on the vehicle, for purposes of identifying the components. The processor may also integrate data concerning the component and provide an overall output or signal indicative of the condition of the operating vehicle. The processor output may also provide a maintenance request to initiate further checks or perform repairs.

In this manner, the present invention provides a system and method for monitoring the condition of a vehicle that is capable of providing real-time data that is indicative of current operating conditions of components and the vehicle in a manner to allow for optimum timing of parts maintenance and replacement.

BRIEF DESCRIPTION OF THE DRAWINGS

The features and advantages of the present invention will become apparent from the following detailed description of the invention, when read with the accompanying drawings in which.

DETAILED DESCRIPTION OF THE INVENTION

In order to effectively manage a vehicle or a fleet of vehicles, it is necessary to minimize the amount of down time and repair activities associated with the operation of the vehicle. In this regard, condition-based monitoring systems have been integrated with automated vehicle management systems, whereby sensors are located proximal different components of the vehicle for monitoring operation thereof. In the present invention, a wireless "on-board" transmitter and wireless "off-board" receiver are used to gather data relative to the operation of the vehicle, that may be stored on the vehicle during the operation of the vehicle. The system may also comprise at least one, or an array of sensors used to detect phenomena emanating from the vehicle and/or components of the vehicle to monitor the condition of the vehicle. Thus, the present invention takes advantage of on-line opportunities to gather data without subjecting the vehicle to down time to obtain such data.

Figure 1:
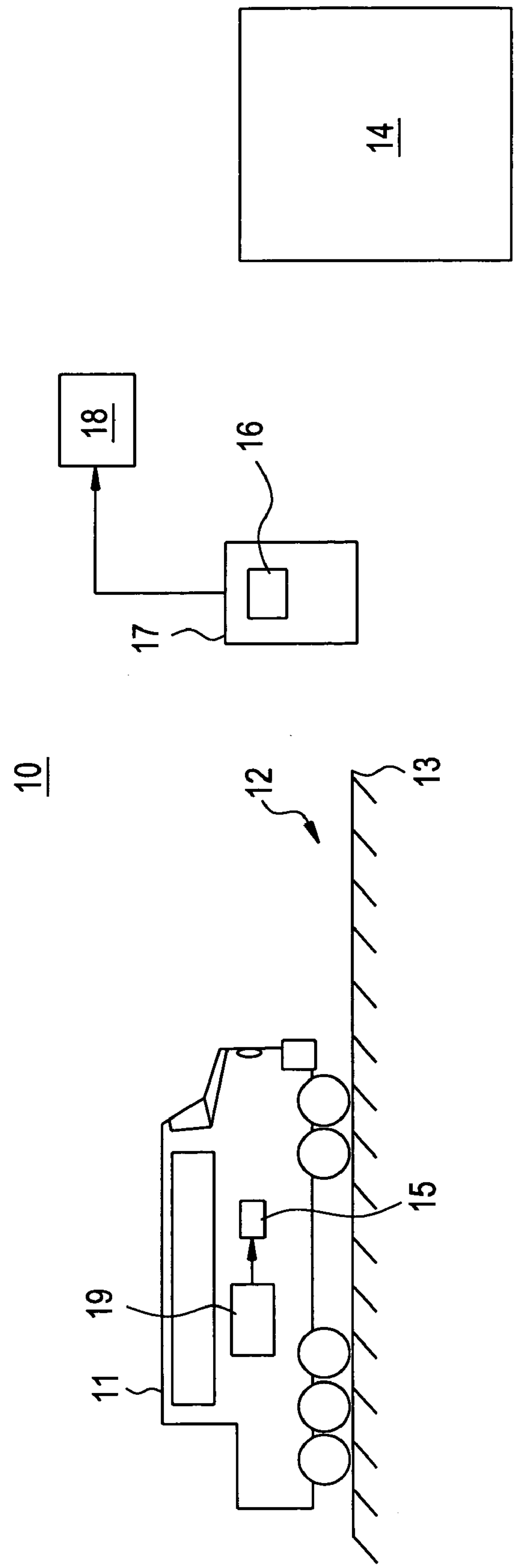
FIG. 1 is a schematic illustration of the system for monitoring the condition of a vehicle.

Accordingly, an exemplary embodiment of the invention is schematically illustrated in FIG. 1 for use in monitoring the condition of a vehicle and/or a fleet of vehicles. Although primarily illustrated and described with respect to a mobile asset such as a locomotive or fleet of locomotives, the present invention is not so limited and may be used in connection with for example trucks, heavy operating equipment such as loading cranes, excavation equipment, and shipping equipment such as water-going vessels.

With respect to FIG. 1, the monitoring system 10 is used in connection with the condition-based monitoring of the vehicle 11. The vehicle 11 is shown traveling a path of travel 12 along a railroad 13. The monitoring system 10 may comprise a plurality of sensors (not shown) disposed at various locations on the vehicle for detecting operating parameters of the vehicle 11 and/or its component parts. Such sensors are known in the field and may be mounted at various locations to detect phenomena associated with fuel pressure, oil pressure, water temperature, engine vibration, bearing vibrations, engine combustion performance, radiated noise sources or extreme thermal patterns.

The sensors are linked with an on-board computer system 19, which stores the data. The computer system 19 may also be capable of analyzing the data to provide signals or displays indicative of the condition of the vehicle 11, and/or its component parts. The data stored in the computer system 19 may contain other data related to the operating condition of vehicle 11 such as ambient conditions, on-board inventory count, vehicle location, etc.

A wireless transmitter 15 is disposed on the vehicle 11, and in communication with the vehicle computer system 19, for gathering and transmitting the data stored in the computer system 19. The computer system 19 may periodically or continuously download the data to the transmitter 15 during the operation of the vehicle 11. In the present invention, the transmitter 15 transmits the data to a wireless "off-board" receiver 16 preferably positioned proximal to the path of travel 12 of the vehicle 11. The receiver 16 may be located along the path of travel 12 of the vehicle 11 at points where the vehicle 11 will proceed at a low rate of speed for the effective transmission of the data. In addition, the receiver, may be mounted within a structure or housing 17 for protection from ambient conditions.

As the vehicle 11 approaches the receiver 16, the transmitter 15 transmits the data to the receiver 16. The receiver 15 then stores the data and/or transmits the data to a processor 18 where the data is stored and analyzed. The processor 18 may be stationed adjacent to the receiver, or within the nearby service station 14, so analysis of the data may be performed locally. Alternatively, the receiver 16 is remotely stationed with respect to a processor 18 that may be centrally located as part of a communication network for transmission of data concerning the vehicle 11, or a fleet of vehicles.

The components, e.g. transmitter 15 and receiver 16, may be typical wireless networking components used in the 802.11b wireless local area networks (WLANs) that transmit data over a predetermined bandwidth or range of bandwidths. Such networks typically transmit data at the unlicensed 2.4 GHz band, and are readily available from manufacturers and suppliers known to those skilled in the art. This bandwidth, or range of bandwidths surrounding it, enables the wireless transmission for a limited distance, but at a high rate of speed.

The processor 18 is programmed to analyze the data and generate a signal, or output, that is indicative of a condition of the vehicle 11, or components of the vehicle. The output may provide recommendations concerning servicing of the vehicle 11 and its various components. A vehicle 21 operation activates the transmitter 15 when the vehicle is within a prescribed distance of the structure 22 and/or transmitter 15. Activation of the transmitter 15 may be automatic through the vehicular computer system 19, which can identify the location of the vehicle 11 with respect to the receiver 16 obtained through available global positioning means or other systems that can provide location of the vehicle 11 with respect to the structure 17 and receiver 16. Given the bandwidth of the center technology, the vehicle 21 should preferably be within a few hundred feet of the receiver 16. The transmitter is activated for a predetermined timed duration to ensure effective transmission of all data available for transmission.

In a second embodiment, the monitoring system 19 comprises a structure 22, having at least one sensor 23 secured thereon for detection of at least one phenomenon associated with the operation of the vehicle 21. In an exemplary embodiment, the structure 22 may take the form of a partial enclosure through which the vehicle 21 may pass. The structure 22 is proximally located to a path 30 of travel of the vehicle 21 and disposes sensors 23 sufficiently close to the vehicle 21 to effectively detect physical phenomena emanating from the vehicle 21 and/or component parts thereof. Such a structure may include walls in which sensors 23 are imbedded. In this manner, the structure 22 to some degree can control ambient conditions including wind, temperature and noise that may affect the sensitivity of the sensors 23.

The structure 22 shown herein covers a path of travel 30 of the vehicle 21, e.g., locomotive traveling along a railroad track 39. The structure 22 is preferably located adjacent a vehicle servicing area 25, which provides an opportunity to detect various physical phenomena emanating from the vehicle 21. As the vehicle 21, such as a locomotive, approaches a servicing station 25, the speed of the vehicle 21 may slow to only a few miles per hour. At such a speed, the sensors 23 may effectively detect physical phenomena emanating from the vehicle 21 and or components 24 of the vehicle. The term "component" as used in this disclosure includes the individual parts of a locomotive, such as turbo bearings, water pump assemblies, wheel bearings etc. The term "component" may also include various subsystems such as the gear train, water coolant system, radiator fan, air compressor, fuel injectors, engine power assembly, tractive effort motors, fuel pumps, wheel assemblies, etc., within the vehicle 21 that comprise a plurality of different parts.

Figure 3:
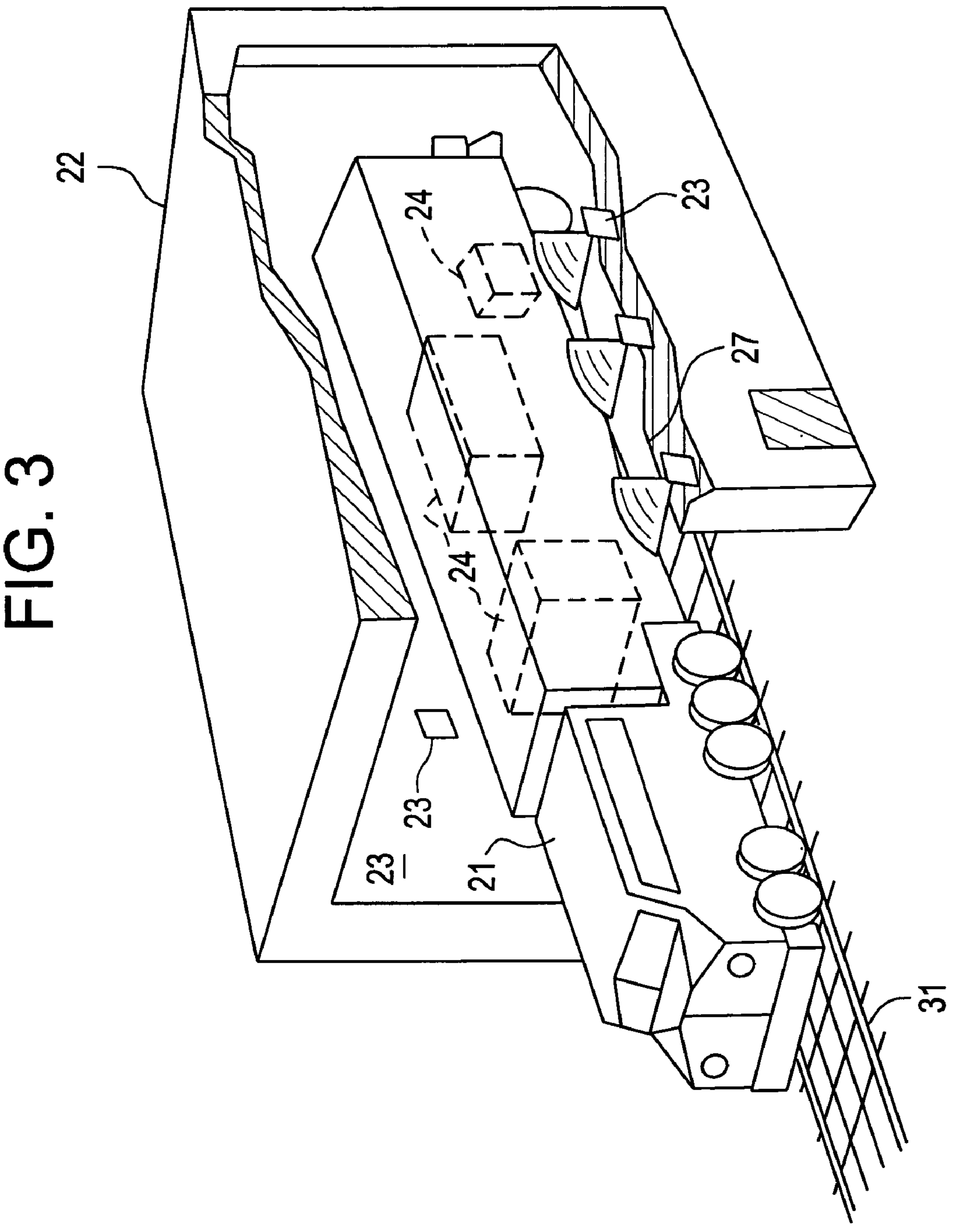
FIG. 3 is a sectional elevational view of the frame structure and sensors for the present invention.

With respect to FIG. 3, the structure 22 may comprise the sensors 23 mounted within an enclosure wherein the sensors 23 are disposed adjacent openings 27 for detection of the physical phenomena. The openings 27 may be covered with a covering (not shown) such as a metallic screen material or a thin Plexiglas for protection of the sensor 23 from interference of ambient conditions. The sensors 23 may be secured directly to the structure 22, or to an mounting assembly disposed within the enclosure 28. The sensors 23 may be disposed on the structure over the track 39 and the vehicle 21, and along the sides of the vehicle 21. In addition, the sensors 23 may be disposed underneath the track 31 and the vehicle 21 as necessary to detect phenomenon emanating from certain components 24.

Figure 4:
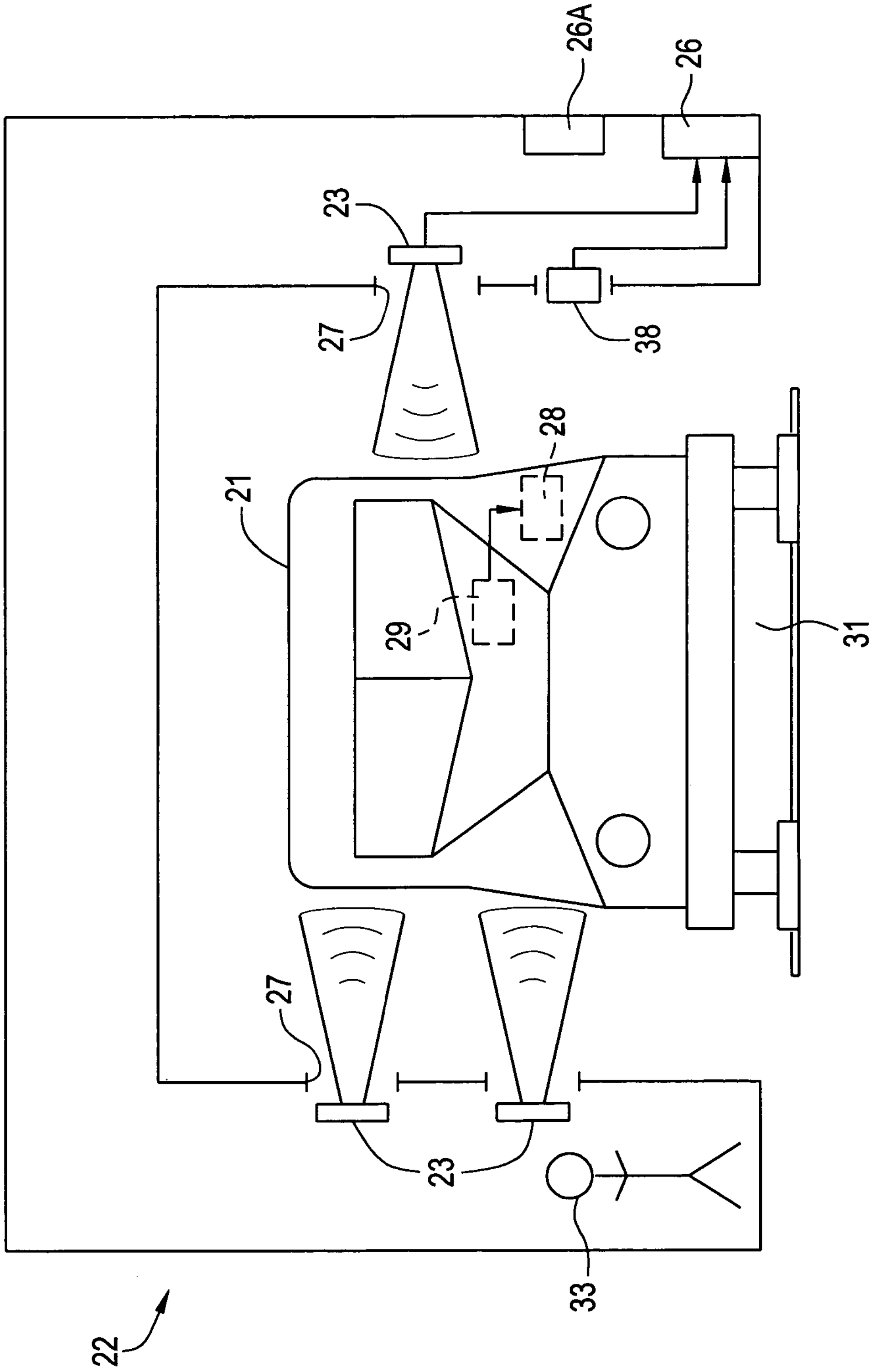
FIG. 4 is front sectional elevational view of the frame structure with sensors

As shown in FIG. 4, the structure 22 may be sufficiently large to house the processor 26 display or any other equipment necessary for operation of the system. Alternatively, the processor 26 and/or display may be remotely positioned with respect to the sensors 23, as in wireless communication networks, known to those skilled in the art. In addition, enough room within the enclosure 27 should be available for one or more operators 20 to comfortably move about to operate or maintain the system 19.

However, the invention is not limited by the size or shape of the structure 22. For example the sensors 23 maybe mounted to an assembly that may comprise a plurality of frame members. Such a structure would not include any large enclosure, but each sensor may have a housing within which it is maintained and mounted on a frame member.

The sensors 23 may include ultrasound-based sensing devices, infrared-based sensing devices, vibration sensors, acoustic-based sensing devices or electrical test equipment, etc. The array of sensors 23 is contemplated to detect a variety of physical phenomena including, but not limited to, temperature, vibrational movement, sounds, etc. Such physical phenomena may be attributed to various operating conditions of component parts of the vehicle and/or failure modes such as valve and seal leakage of fluids, liquid or gas from components such as water pump and oil pump assemblies, or air compressors to out-of-balance vibration, which may be attributed to bearing defects, overheated connectors, wheels or bearing in electrical arcing and potential insulation defects. These sensors 23 are commercially available from appropriate suppliers.

As shown in FIGS. 3 and 4, the sensors 23 are optimally positioned along the frame structure to detect the physical phenomenon. The sensors 23 may be disposed at elevations corresponding to the location of certain components 24 from which these physical phenomena may emanate, or to cover an elevation or defined area of the vehicle 21 in which components are located. Once a sensor 23 is activated, or begins detection of the physical phenomenon, the processor is able to immediately identify the component 24 as generating the signal from the sensor 23. However the sensors 23 do not have to correspond to any particular component 24, but may be positioned to optimize detection of physical phenomenon generated from any location on the vehicle 21 as it passes the sensor 23. And, as will be explained in more detail below, the processor 26 is capable of identifying a particular component 24 from which the physical phenomenon is generated.

In an exemplary embodiment, the vehicle 21 may be also be equipped with a wireless transmitter 28 for the wireless transmission of data stored on board within a vehicle computer system 29. A wireless receiver 38 is mounted to the structure 22 and optimally positioned for receiving data transmitted from the transmitter 28. The transmitter 28 and receiver 38 operate as described for the wireless transmission of data during the operation of the vehicle 21. The computer system 29 may periodically or continuously download data to the transmitter 28, which then transmits data via wireless communication to the wireless receiver 38, mounted to the structure 22.

Figure 2:
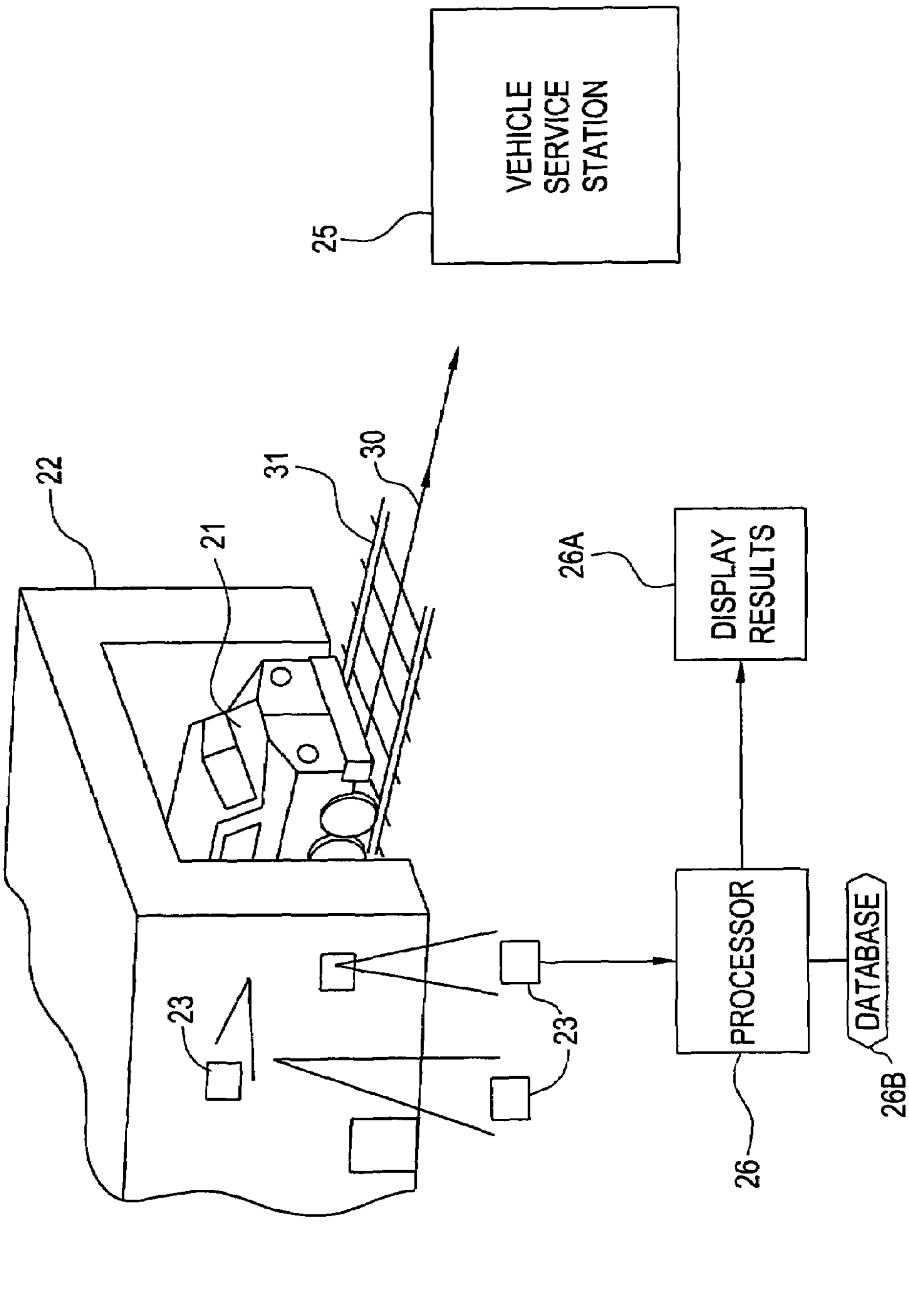
FIG. 2 is a schematic illustration of a second embodiment of the monitoring system.
Figure 5:
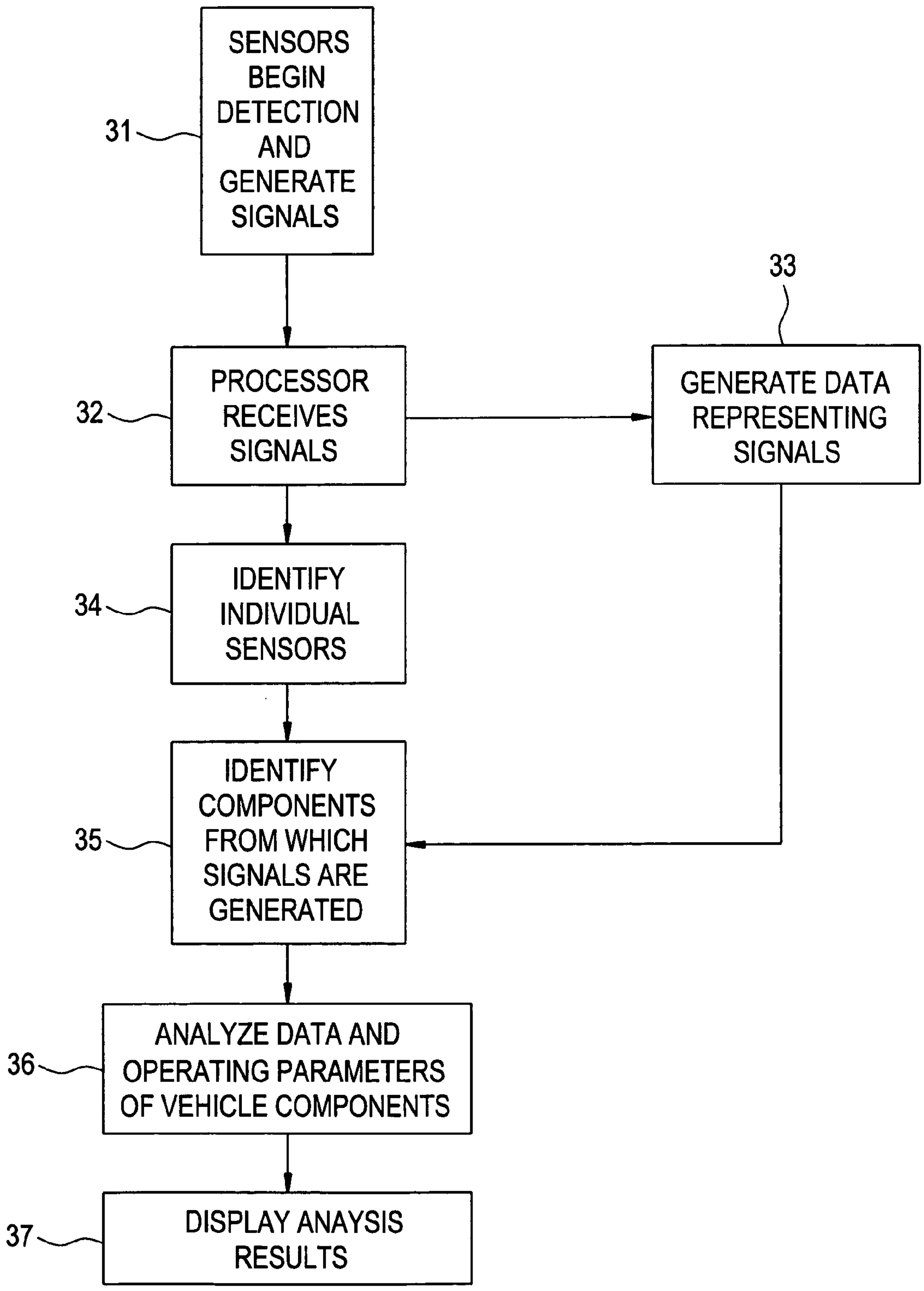
FIG. 5 is a flowchart illustrating operation of the present invention.

The method for the invention is referenced with respect to FIGS. 1, 2 and 5. With respect to FIG. 5, steps 31 and 32, as the vehicle 21 passes the frame structure 22, the sensors 23 detect the physical phenomena emanating from the vehicle 21 and generate a signal that is associated with an operating parameter of the vehicle 21. The signal is transmitted to, and received by, the processor 26.

In step 32, the processor 26 collects data by digitizing the signals and generates data, usually in a waveform having frequency, amplitude and/or time. In order to analyze collected data, the processor 26 must correspond the data to a particular vehicle component 24. In steps (Blocks 34 and 35), the processor 26 identifies the sensor 23 detecting the physical phenomena, and then identifies the components 24 generating the phenomena. In this manner, the processor 25 is capable of comparing the generated data to historical data representing operating parameters of the components 24 and vehicle 21.

The database 26B may contain a geometric configuration of the vehicle 21, including its various components 14. The geometric configuration may be that of a vehicle 21 representative of a group of vehicles within a fleet of mobile assets, or a configuration may exist for each individual vehicle 21 that passes the structure 22. The geometric configuration comprises the identification and location of various components 24 on the vehicles 21. A vehicle 21 may be assigned an identification number, which corresponds to a geometric configuration representative of that vehicle 21, or a group of vehicles.

In an exemplary embodiment, the processor 26 comprises historical spectral data relating to a specific areas or components 24 on the vehicle 21. A spatial map may be generated from the historical spectral data of the vehicle which map provides a spatial coordinate, including the location of parts along longitudinal and elevational axes of the vehicle. The spectral data comprises coordinates of frequency and spatial coordinates (x, y). The spectral data also includes waveforms, which similarly provide a print of the vehicle and its components 14.

As represented in steps 36 and 37, the data received from sensors is compared to the historical data and/or geometric configuration to identify the components 24 associated with the detected phenomena.

In another embodiment, the processor 26 may integrate an algorithm by which a location of component or subsystem may be calculated within the vehicle 21, using the rate of speed by which the vehicle 21 passes a certain sensor. For example, a vehicle traveling a rate of 5 miles per hour may activate a locating sensor (not shown), which corresponds to a location on the vehicle 21 at the front of the vehicle 21. When a sensor 23 detects a physical phenomenon 2 seconds after the location sensor is activated, a vehicle 11 that is 100 feet long traveling at 5 miles per hour places the subsystem 24 from which physical phenomena is emanated at approximately 16 feet from the front of the vehicle.

In an exemplary embodiment, the processor 26 is linked with a database 26B that comprises historical data regarding the operating condition of the vehicle 21 and its components 24, from which physical phenomena have been detected. In another exemplary embodiment, the database 26B may comprise historical data representing various operating conditions of the vehicle 21 and/or its components 24, which historical data is obtained from a population of like component parts or vehicles.

The database may contain various operating parameters within which components effectively operate, including providing data representative of normal operation of a component, incipient failure conditions, or condemning limits at which limits may indicate failure of the component parts. The processor 26 is programmed to implement at least one or more algorithms that compare data obtained from the sensors 23 to the historical data within the database 26B of the processor 26. Based on a comparison of the collected data to the historical data, the processor 25 generates a signal that is indicative of a condition of the vehicle 21 and/or a component 24. The results of this analysis may be presented or placed in a variety of forms, including a general health indicator of the different vehicle components or subsystems; flagging certain components with impending or imminent failures; and recommending corrective actions. The display 26A of the recommended actions can be displayed on a link with the processor 26 and/or sensor 23 as part of the structure 22 or on a repair kiosk at the fueling or service stations 25 Similarly, remote displays may be available through an information communication network, so that users at various remote locations may review information or data made available on a particular vehicle passing by or through the frame structure and sensors.

Figure 6:
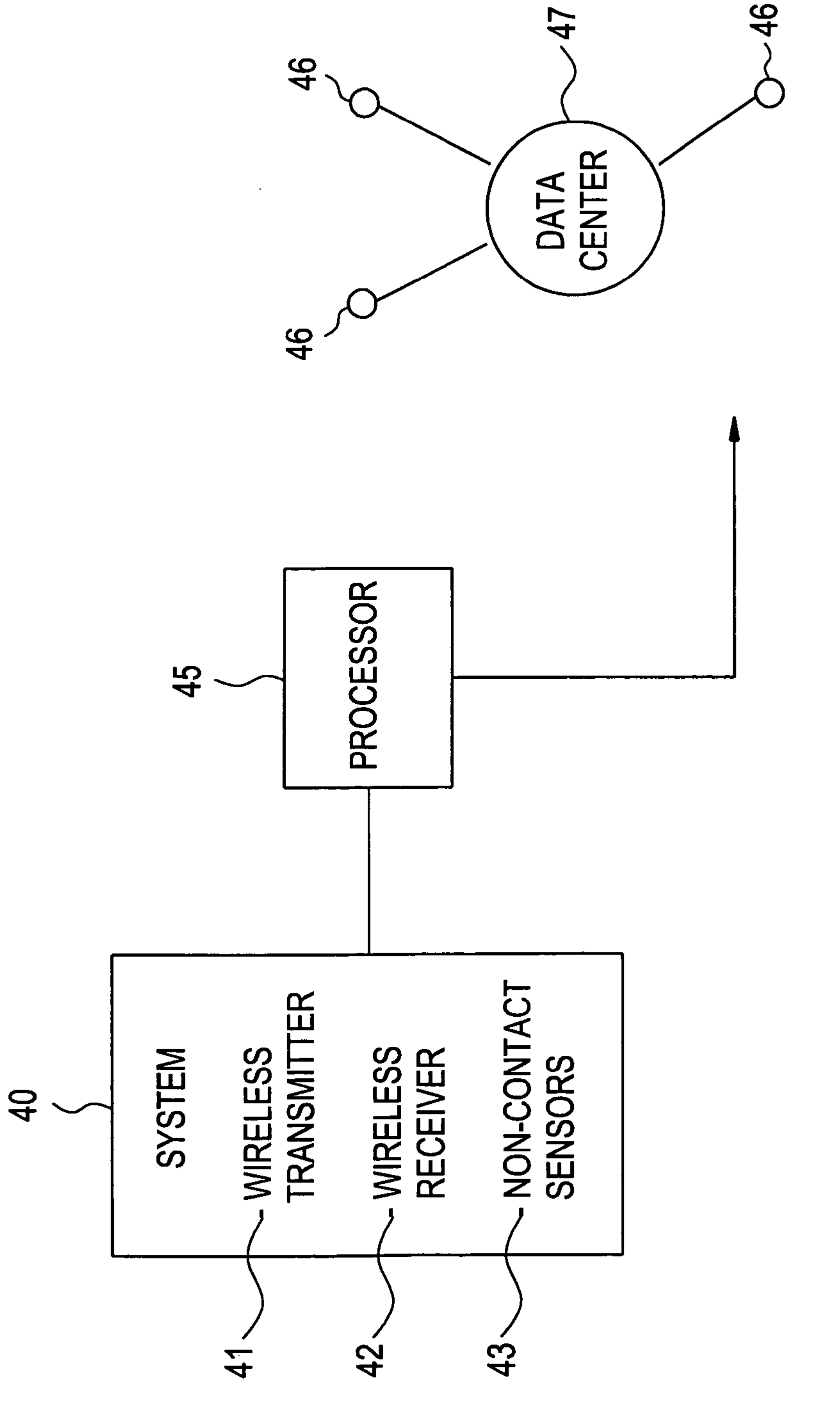
FIG. 6 is a schematic of the present invention linked with a communication network.

With respect to FIG. 6, an exemplary embodiment of the invention is shown integrated with an information communication network, so that a variety of users remote locations 46 may review data obtained from a vehicle 41 passing by the frame structure 42. As shown in FIG. 5, the monitoring system 40 comprises the frame structure 42 having sensors 43 mounted therein for detecting physical phenomena emanating from the vehicle 41 as it passes the frame structure 42.

The data obtained from the sensors 43 and generated by the processor 45 may be analyzed locally at the monitoring system 40 locations, and/or transmitted to remote locations for analysis. Signals generated by the sensors 43 are digitized for transmission to a processor 45 which may be integrated with the sensor 43, or provided as a separate component. The processor 45 may comprise a server for integration with the network communication system. Similarly the analysis results determined locally may be transmitted via the network for analysis and storage at remote locations. For example, data and/or analysis results may be transmitted to a data center 47, which conduct analysis on raw data and/or integrate data results into its own central database. Remote locations may gain access to the data and/or analytical results via an Internet or Intranet communication system. Accordingly, such a system may comprise available technologies for transmission of information via the Internet and/or an Intranet, which are known to those skilled in the art. Such a communication system may be particularly advantageous for operation and maintenance for a fleet of vehicles.

While the preferred embodiments of the present invention have been shown and described herein, it will be obvious that such embodiments are provided by way of example only and not of limitation. Numerous variations, changes and substitutions will occur to those of skilled in the art without departing from the teaching of the present invention. Accordingly, it is intended that the invention be interpreted within the full spirit and scope of the appended claims.

What is claimed is:

1. A system for monitoring the condition of a vehicle, comprising:

(a) a structure positioned proximal to a path of travel followed by said vehicle wherein the structure comprises a first wall panel positioned on a first side of the path of travel of the vehicle and a second wall panel is positioned on a second side of the path of travel of the vehicle;

(b) an array of off-board sensors mounted to the structure and not on the vehicle, for detecting physical phenomena emanating from the vehicle and associated with a plurality of operating parameters of the vehicle, as said vehicle passes said structure along the path of travel wherein the sensors are mounted on one or both of the panels;

(c) said sensors detecting said physical phenomena emanating from the vehicle without contacting the vehicle, and generating a signal responsive to said phenomena detected; and (d) a processor in communication with the sensor, for receiving said signal transmitted from the sensors and for processing said signal.

2. The system of claim 1 wherein the structure further comprises a roof panel extending over the path of travel of the vehicle and is mounted to a top end of each of the first wall panel and second wall panel forming an enclosure having an entrance and exit for the vehicle.

3. The system of claim 1 wherein in the vehicle is a locomotive and the path of travel is a locomotive track and the structure comprises a first wall panel positioned on a first side of the locomotive track and a second wall panel is positioned on a second side of the locomotive track and an array of sensors is mounted on one or both of the panels.

4. The system of claim 3 wherein the structure further comprises a roof panel extending over the locomotive track and is mounted to a top end of each of the first wall panel and second wall panel forming an enclosure having an entrance and exit for the locomotive.

* * * * *